Patented Mar. 26, 1946

2,397,453

UNITED STATES PATENT OFFICE 2,397,453

TREATMENT OF FIBROUS MATERIAL

Erven White, Granville, and Clayton A. Smucker, Newark, Ohio, assignors to Owens-Corning Fiberglas Corporation, Toledo, Ohio, a corporation of Delaware No Drawing. Application May 25, 1942, Serial No. 444,486

8 Claims. (Cl. 260—8)

The present invention relates to the treatment of mineral wool and the like with water-insoluble resinous materials. It provides the formation and emulsification of such materials for application to fibrous mineral material in the production of bonded mineral wool.

In many of the present processes of making mineral fiber bats for thermal insulation, acoustical control, battery mats, etc., the fibers are deposited on a conveyor immediately after their formation to cause them to build up into a mat. Before or after their collection in a mat, a binding material is sprayed onto the fibers and is subsequently hardened in suitable manner to hold the fibers firmly together in the mat.

Polymerized resinous materials have been used to bond mineral wool. Such materials are applied to the mineral fibers in partially polymerized state either alone or in combination with other materials such as tempering oil, for example, the tempering oil disclosed in the Williams and Bone Patents No. 2,083,132 and No. 2,107,284. The application of these thermosetting binders in partially polymerized state is desirable because it permits a greater concentration of the binder on the fibers and reduces the amount of heat required to cause it to set up or harden. Also, the partially polymerized material is less volatile, resulting in greatly reduced volatilization loss during the application and the subsequent heat treatment of the material.

It is also desirable to apply the thermosetting materials in a suitable vehicle to effect uniform distribution of the binder over the fiber surfaces. The vehicle is most advantageously water, thereby minimizing the cost of application and avoiding the fire hazards entailed in the use of a great many other vehicles. For instance, as disclosed in the Bergin and Simison patent No. 2,252,157, phenol formaldehyde is admixed with water while in the water-soluble stage and this solution sprayed onto the mineral fibers.

It is the object of the present invention to provide improved bonded mineral wool.

The present invention provides as a binding material for mineral wool, polymerized furfuryl alcohol. This is relatively inexpensive, is thermosetting, and therefore does not soften when subjected to elevated temperatures. It has high strength so that it may be used in relatively small amounts.

Furfuryl alcohol has previously been unsuitable for this purpose because it is not adaptable to the desired procedure of application. Furfuryl alcohol becomes highly water-insoluble when partially polymerized so that it cannot be placed in water solution. Nor could the material previously be applied as an emulsion in water because conventional methods of emulsification when applied to polymerized furfuryl alcohol result in dispersions in which all or part of the dispersed phase is in such large particles or conglomerations of particles that the emulsion is unstable. The large particles also clog pipe lines, spray nozzles and other parts of the applying apparatus.

The previous emulsions of partially polymerized furfuryl alcohol contained particles as large as fifty microns and varying in a single batch of the emulsion from one to fifty microns. This nonuniformity and large particle size caused great unstability in the emulsion and prohibited its use as a binding material for mineral wool as well as very seriously restricting its commercial application generally.

It is another object of the present invention to treat furfuryl alcohol to enable it to be employed as a binding material for mineral fibrous products.

It is a further object of the present invention to provide a highly stable uniformly fine dispersion of polymerized furfuryl alcohol in an aqueous medium for bonding mineral wool. The furfuryl alcohol may be polymerized to ample extent before its application to the fibrous material so that a relatively small amount of heating is required to set up the binder.

It is another object of the invention to provide emulsions of partially polymerized furfuryl alcohol having incorporated therewith catalysts that have novel properties in cases where the emulsion is employed in the production of bonded fibrous products.

It is still a further object to employ as emulsifying agents certain materials that may serve dual purposes, in that the material may act as a bonding agent itself after its emulsifying function has been utilized.

In accordance with the present invention, monomeric furfuryl alcohol is mixed in desired proportions with water. The monomer is completely water-soluble and therefore may be diluted to any extent. To this aqueous solution of the material an emulsificant is added in suitable proportion. Polymerization of the furfuryl alcohol is then effected by heating or catalysis and preferably by a combination of the two methods. The polymerization is carried out to an extent indicated by the use to which the final product is to be put. The resulting product is a very finely dispersed, highly stable emulsion of polymerized furfuryl alcohol in water.

The furfuryl alcohol, water and emulsifying agent may be mixed in any desired order. For instance, the furfuryl alcohol may be mixed into a warm aqueous solution of the emulsifying agent, or the emulsifying agent may be first combined with the furfuryl alcohol and this mixture combined with water. Where a catalyst is employed, it is preferably added to the mixture after all the other ingredients have been combined. However, if the temperature is properly controlled, the catalyst may be added directly to the furfuryl alcohol before the admixture with water.

The proportion of furfuryl alcohol to water may be varied over a wide range depending upon the solids content, the viscosity, and other properties desired in the finished emulsion. The emulsion may be diluted with water after its formation to substantially any extent so that wide latitude is permitted in the amount of water employed during the polymerization. Where a high solids content is sought, one part of unpolymerized furfuryl alcohol to two parts or more of water may be used. We have found that in some cases difficulties may attend the use of less than two parts of water but there seems to be no limit to the degree that the water may be increased. However, greater economy is usually realized if the minimum quantity of water is employed.

Various emulsifying agents such as raw and dextrinized starch, ammonium caseinate or acid stable caseinates, bentonite, and dispersible proteins such as gelatin may be employed. A distinct advantage of the invention in this respect is that it permits a much wider choice of emulsifying agent, and those too poor to be considered in conventional processes may be fully satisfactory in the present case. Further, it requires only a minimum amount of the emulsifying agent due to the more efficient use thereof caused by the better distribution of the emulsifier on the dispersed phase. The reduced amount of emulsifying agent in the finished emulsion, of course, reduces the cost, and it also permits better flow of the resin over the fibers of the mineral wool during application.

While bentonite and ammonium caseinate were among the better emulsifying agents in conventional processes, they were needed in amounts of 8 to 15% of the furfuryl alcohol to secure an emulsion of any kind. The sizes of the particles or conglomerates of particles range from about two to fifty microns so that the emulsion is unsuitable for many purposes, being unstable unless the solids content, that is, the furfuryl alcohol, is less than about 5 to 15% of the total emulsion.

By the process of the present invention bentonite and acid caseinates, as well as the agents such as gelatin that were found unsuitable in conventional processes, are required in amounts of from only ¼ to 2% of the furfuryl alcohol for solids content of the emulsion as high as 30%. Not only is the cost of the emulsion thus sharply reduced but the particle size of the dispersed partially polymerized resin is of from one to five microns with attendant great stability. Partially polymerized furfuryl alcohol dispersed in water by the present process will remain completely emulsified indefinitely.

We have discovered that cationic-active materials, although unsuitable as the emulsificant in previous processes, may be employed to great advantage in the present case. They provide very stable emulsions of very fine particle size, the particles being uniformly of a size of one to two microns. Cationic-active materials that have been found suitable may be the acid salts of either simple or complex amines, such as a complex stearyl amine. The acid salts of amines such as cetyl or stearyl monoamine hydrochloride, trimethyl ammonium bromide and similar materials are examples of suitable cationic-active materials. Although such emulsifying agents are relatively costly, their use in the present process is commercially feasible due to the very small amounts required, usually less than 2%.

The present process makes possible the production of an emulsion of furfuryl alcohol in which all the constituents except, of course, the water, may be utilized to serve a beneficial purpose in a completed mat of bonded fibrous material. Emulsifying agents such as gelatin are in themselves film-forming, adhesive materials and when the water in the emulsion is driven off during curing of the furfuryl alcohol the gelatin remaining on the fibers of the mat may also act as a binding agent and increase the bond produced by the furfuryl alcohol. To some extent starch and caseinates may act in similar manner. While only very small amounts of these emulsifying agents are required in the present case even these small quantities do not represent a loss in the sense of serving no useful purpose in the finished product.

Emulsifying agents of a cationic-active nature also serve a dual purpose but in a different manner. In the use of the emulsion in producing bonded inorganic fibrous material, such as glass wool, the cationic-active emulsificant left on the fibers after the water has been driven off serves to lubricate the surfaces of the fibers. This deters mutual abrasion of the fiber surfaces even in the presence of moisture due to the great affinity of such materials for glass and their lubricating properties for glass surfaces.

Anionic-active materials such as sodium salts of sulfonated dialkyl esters, alkyl-aryl naphthalene sulfonates, and sodium salts of alkyl sulfonates and sulfates, available as the aerosol series, may also be employed as emulsifying agents in the present case and with commensurate results.

Any suitable catalyst may be employed and in an amount depending upon the properties desired in the finished resinous material and the uses to which it is to be put. For example, 1 to 5% of hydrochloric acid on the basis of furfuryl alcohol is highly effective in the present polymerizing and emulsifying operation. Other inorganic acids and salts such as ferric chloride may be substituted for hydrochloric acid if desired.

It is sometimes desired to store the emulsion of furfuryl alcohol for some time as in the case where it is placed in a reservoir and fed therefrom to sprays for applying the material to fibrous mats. With some catalysts there is a danger that the resin will continue to polymerize with the result that it is too far advanced to obtain the best results possible in bonding the fibrous material. After some greater length of time the polymerization may even reach completion with attendant difficulties sometimes of maintaining the dispersion of the fully polymerized material.

We have found that these difficulties may be avoided if catalysts of limited activity are employed but whose activity may be increased at the desired time, for instance, after application of the emulsion to the fibrous material. Such catalysts may be employed during the initial polymerization and concurrent emulsification in place of those already mentioned or may be added to the emulsion at some later time if desired. With a catalyst of this type, the partially polymerized material may be held as long as necessary without any substantial or harmful advance in the degree of polymerization.

It has been found that materials highly suitable for this purpose are those that decompose at the temperature employed to complete polyization, and preferably at a temperature above that employed in the initial polymerization, and that supply as one product of the decomposition an acid or the like having catalytic properties. Such material may be, for example, ammonium phosphate which upon heating to about 400° F. at the time of curing the furfuryl alcohol decomposes into phosphoric acid and ammonia. The acidic product acts as a catalyst during curing and greatly hastens the final polymerization at the desired time. Similar and somewhat better results may be obtained from the use of ammonium chloride which decomposes upon heating to give hydrochloric acid. At the temperature used in curing the resinous material, this acid is vaporized so that it thoroughly permeates all portions of a fibrous mass, assuring intimate relation between the acid catalyst and resinous material being polymerized.

This intimate relation of catalyst and resin may be also obtained by the use of diethyl sulfate in the emulsion in addition to or in place of the compounds already mentioned. The sulfate is soluble in the partially polymerized furfuryl alcohol and insoluble in the aqueous phase of the emulsion so that it is always in the best relation to the resin to act as a catalyst. Upon heating of the resin and catalyst to elevated temperature, the diethyl sulfate is decomposed into sulfuric acid and some volatile ethyl products. These latter may be driven off while the acidic product serves as a catalyst to hasten curing of the resin.

Instead of diethyl sulfate to provide the catalyst it has been found possible to employ sulfuric acid in butyl alcohol. This combination is water-insoluble but soluble in the resin phase. It is stable at lower temperatures, that is, up to about 300° F., and at higher temperatures decomposes to release sulfuric acid to act as a catalyst.

Both diethyl sulfate and sulfuric acid in butyl alcohol may be added to the mixture of unpolymerized furfuryl alcohol, water, and emulsifier before the initial partial polymerization is effected. Ammonium chloride and ammonium phosphate, however, are preferably added just before the emulsion of partially polymerized resin is applied to the fibrous or other material to be treated, because their activity is high enough to cause the polymerization to advance undesirably under some conditions. All these substances decomposable into acidic catalysts may be incorporated in the emulsion of polymerized furfuryl alcohol in addition to the catalyst employed in the initial partial polymerization although they may be used to replace such catalyst if found desirable. It is generally more economical, however, to employ a catalyst such as starch, cationic-active materials or the like in the preliminary polymerization since lesser amounts of these are required. The decomposable substance is then either added at the beginning of the process or at some later time.

These decomposable substances are especially valuable when employing the emulsion in the binding of fibrous mineral material but may also be valuable in other uses of the emulsion where like or similar circumstances prevail.

The mixture of water, unpolymerized furfuryl alcohol, catalyst and emulsifying agent may be heated to any suitable temperature and for a length of time depending upon the degree of polymerization required. Usually rapid polymerization takes place at about 98° C., which permits the process to be carried out in open kettles and eliminates the need for special apparatus. The degree of polymerization may be limited to be consistent with the degree of stability required but in all cases may be substantial, whereas previously any amount of polymerization, no matter how slight, prevented obtaining a stable emulsion containing more than 5 to 15% furfuryl alcohol.

The temperature and degree of polymerization is much more easily controlled in the present process due, apparently, to the relatively large quantity of water present during condensation. It is also possible in the present process to add cold or hot water at desired stages of the polymerization to thereby control the temperature of the material undergoing condensation.

The finished emulsion of partially polymerized furfuryl alcohol in the present invention may be diluted with water in any desired degree without perceptibly affecting the stability and may have other materials added thereto such as emulsions of oil and water or other resin emulsions. The stability and fine particle size of the emulsion is of a great value where it is applied through spray nozzles to mineral wool. These properties of the emulsion tend to prevent clogging of the spray pipes and nozzles and guard against breakdown of the emulsion while it is standing in a supply reservoir and during storage.

The emulsion of partially polymerized resin may be mixed with oil or the like and applied to mineral fibers before or as they build up into a mat or to the formed mat. The mat is then heat treated usually at temperatures above about 250° F. to complete polymerization of the furfuryl alcohol and cause it to harden and bind the fibers together in an integral mass. The amount of binding material incorporated in the mat depends upon the rigidity required and usually is from 2 to 10% of the weight of the fibers.

Various modifications may be made within the spirit and scope of the appended claims.

We claim:

1. As an article of manufacture, a mass of mineral wool fibers bonded into an integral bat with polymerized furfuryl alcohol and gelatin distributed throughout the mass.

2. As an article of manufacture, a mass of mineral wool fibers bonded into an integral bat with polymerized furfuryl alcohol and bentonite distributed throughout the mass.

3. As an article of manufacture, a mass of mineral wool fibers bonded into an integral bat with polymerized furfuryl alcohol and starch distributed throughout the mass.

4. As an article of manufacture, a mass of mineral wool fibers bonded together into an integral bat with a binding agent distributed throughout the mass, the bonding agent comprising polymerized furfuryl alcohol and a film-forming substance selected from the group consisting of gelatin, starch, bentonite, and ammonium caseinate.

5. A mineral fiber treating and bonding material comprising a stable aqueous emulsion of partially polymerized furfuryl alcohol in which the ratio of water to furfuryl alcohol is at least two to one, and a film-forming substance as an emulsifying agent for the furfuryl alcohol, said substance being selected from the group consisting of gelatin, starch, bentonite and ammonium caseinate, the film-forming material aiding in bonding the fibers together when the treating material is applied to a mass of mineral fibers.

6. A mineral fiber treating and bonding material comprising a stable aqueous emulsion of partially polymerized furfuryl alcohol in which the ratio of water to furfuryl alcohol is at least two to one, and gelatin as an emulsifying agent for the furfuryl alcohol, the gelatin aiding in bonding the fibers together when the treating material is applied to a mass of mineral fibers.

7. A mineral fiber treating and bonding material comprising a stable aqueous emulsion of partially polymerized furfuryl alcohol in which the ratio of water to furfuryl alcohol is at least two to one, and bentonite as an emulsifying agent for the furfuryl alcohol, the bentonite aiding in binding the fibers together when the treating material is applied to a mass of mineral fibers.

8. A mineral fiber treating and bonding material comprising a stable aqueous emulsion of partially polymerized furfuryl alcohol in which the ratio of water to furfuryl alcohol is at least two to one, and starch as an emulsifying agent for the furfuryl alcohol, the starch aiding in bonding the fibers together when the treating material is applied to a mass of mineral fibers.

ERVEN WHITE.
CLAYTON A. SMUCKER.